Patented Feb. 2, 1943

2,310,023

UNITED STATES PATENT OFFICE 2,310,023

SET STABILIZED PLASTER

Harry F. Gardner, Snyder, N. Y., assignor to Certain-teed Products Corporation, New York, N. Y., a corporation of Maryland No Drawing. Application August 29, 1941, Serial No. 408,815

10 Claims. (Cl. 106—110)

This invention relates to calcined gypsum plasters, more especially to such plasters which for their proper use require that variations of their properties with length of time after manufacture or under different conditions of use shall be avoided.

Calcined gypsum plasters are commonly prepared from natural gypsum (CaSO4.2H2O) by calcining the raw material. Normally, heating to drive off the water of crystallization is continued until the amount of water is reduced so that the formula of the calcined product becomes $$CaSO_4; \tfrac{1}{2}H_2O$$

Calcined gypsum plasters for some purposes and particularly for wall plaster or as bedding material in the grinding and polishing operations in the manufacture of plate glass should be without marked variation in their properties and action, especially with respect to their setting time.

The use of ordinary calcined gypsum for these purposes has been unsatisfactory because variations in the setting time and in other qualities occur when the plaster is mixed with different sands or aggregates. Some sands with the same plaster will result in a longer setting time than other sands. Serious variation also occurs with the time elapsed between manufacture and the use of the plaster on the job or in the manufacturing operation. In many cases when the product is shipped from the plaster manufacturing plant and is stored for a period of time, that is, becomes aged, usually a longer setting time is experienced. In some cases if stored for a long time under certain conditions the setting time of the given plaster which has become longer will again become shorter.

In the prior art proposals improvement in set stabilization has been accomplished by the admixture of raw gypsum or land plaster or of set calcined gypsum or of both lime and an acid salt incorporated with the calcined gypsum to be stabilized, which incorporated materials are said to react chemically with each other to form gypsum crystals when the plaster is mixed with water. Portland cement or raw gypsum of a specified micron size also has been proposed. All of these materials require the addition of a retarder to effect set stabilization because they all act as accelerators in the plaster. All such proposals involve the action of the ingredients added to the calcined gypsum when the plaster is mixed with water to form a mortar or slurry for use. These proposals involve the addition in the dry state of the ingredient intended to effect stabilization with the calcined gypsum. In some cases a certain modification of the ingredients may occur after a lapse of time. In other cases the resulting set plaster may be deficient in strength under certain conditions. Because in some of the proposals the action takes place only upon mixing the plaster with water the reaction of the ingredients to produce set stabilization in the intended manner may not take place to a satisfactory extent.

The present invention proposes a plaster of which the base or body material is calcined gypsum but which will be improved in set stabilization as to some of the phases thereof as compared to prior art products which have been intended to be stabilized. According to the invention an auxiliary product is prepared and then incorporated in the base plaster. This auxiliary product utilizes calcined gypsum in set condition to act in the base plaster as a set stabilizing agent. In order, however, to protect this set calcined gypsum of the auxiliary product from variations in its effect upon set stabilization of the base gypsum plaster upon aging or under variations in atmospheric or other conditions, the invention proposes to provide in the auxiliary product an accompanying hydraulic setting material in set condition which itself is not so subject to variations in such conditions.

Portland cement upon hydrolysis and setting becomes a material which is not subject to marked change. It is known that Portland cement hydrolizes in part to lime. Lime itself is subject to marked change in the atmosphere due to the absorption of carbon dioxide. Nevertheless, the hydrolized and set Portland cement has been found to act as a relatively stable material for the purposes of the invention. Whatever the condition or composition of this set material it has been found that for the purposes of the present invention Portland cement in set condition has the quality of acting upon or acting with the set calcined gypsum to secure substantial protection of the latter against the changes which heretofore have been experienced when set calcined gypsum alone has been used as the accelerator in the endeavor to effect stabilization.

When Portland cement is not used set calcined gypsum or raw gypsum accelerator loses its accelerating effect comparatively rapidly on aging. When used in the presence of small amounts of set Portland cement, however, the slowing down of the setting time on aging is counteracted to a large degree and this slowing down does not take place to any extent comparable to that which occurs when set Portland cement is absent and raw gypsum or set gypsum is used for acceleration. The Portland cement first brought to the set condition in accordance with the invention and used with set calcined gypsum accomplishes protection of the latter as above indicated. Such protection has not been achieved in this manner in the prior art.

In accordance with the invention the auxiliary product is first prepared by mixing Portland cement and calcined gypsum with water to produce a mortar or slurry which is allowed to set. The set product is dried and then is ground to produce a material in comminuted form which can be mixed with the base or body calcined gypsum to form a quick setting stabilized stucco, such as plate glass stucco, or which can be mixed with the base calcined gypsum and the proper amounts of retarder to form a stabilized set wall plaster.

As an example of this auxiliary product the following formula may be given although the relative amounts of the ingredients may be varied for different purposes:

| | Per cent |
|---|---|
| Portland cement | 52 |
| Calcined gypsum | 45 |
| Gum arabic | 3 |

In this example a small amount of gum arabic is included. The purpose of incorporating gum arabic is to further insure stabilization of set by protecting against change of the set gypsum of the auxiliary product during the aging period, in which changed form it has lost its accelerating effect and its ability to act as a seed crystal. The gum arabic, therefore, during the aging period aids the Portland cement in protecting the set calcined gypsum so that it will be available and effective in acting as it should as an accelerator in accomplishing set stabilization of the base or body of calcined gypsum of the plaster. In some cases, small amounts, 2 to 10% of chemical accelerators, such as potassium sulphate, alum or acid aluminum sulphate, may be added.

The amount of the auxiliary product which may be mixed with the calcined gypsum of the plaster may be in the range between ¼% and 5%. When this auxiliary product is mixed with calcined gypsum to form a stucco for plate glass bedding it may be used alone without retarder. Such stucco requires a relatively quick set, usually only a few minutes. In the absence of retarder the composite plaster containing the auxiliary product has the capacity of adhering to glass and to the bed plate of the machine to hold the glass for the grinding and polishing operations.

When, however, a plaster is prepared for use as a wall plaster much longer setting time is required than for plate glass bedding stucco. A retarder is added to the base calcined gypsum together with the auxiliary product to secure the combined action of the accelerator and of the retarder to effect the stabilization of set of the wall plaster and to secure a setting time of several hours in most cases.

It is found further that the composite auxiliary product containing Portland cement with or without gum arabic acts to protect the set calcined gypsum of this auxiliary product against the action of heat, which effects calcination of the set calcined gypsum, when the auxiliary product is added to hot calcined gypsum. It therefore becomes possible to complete the preparation of plasters in the manufacturing operations without delays necessary heretofore to secure cooled calcined gypsum to which the set stabilization ingredients are added. The permanence and stability of set which heretofore it has been sought to obtain by the use of set calcined gypsum or of raw gypsum may be obtained in accordance with the invention when the auxiliary product is mixed with hot calcined gypsum.

Having thus described my invention I now claim:

1. An hydraulic setting material comprising a base of calcined gypsum having admixed therewith an auxiliary product comprising calcined gypsum in set condition and Portland cement in set condition.

2. A calcined gypsum plaster comprising calcined gypsum, $CaSO_4; \frac{1}{2}H_2O$, calcined gypsum in set condition, $CaSO_4.2H_2O$, and Portland cement hydrolized and set, the set materials being comminuted and mixed with the calcined gypsum, $CaSO_4; \frac{1}{2}H_2O$.

3. A calcined gypsum plaster comprising calcined gypsum, $CaSO_4; \frac{1}{2}H_2O$, and an auxiliary product in comminuted form comprising the following ingredients, calcined gypsum in set condition, $CaSO_4.2H_2O$, Portland cement hydrolized and set, and gum arabic.

4. Method of producing a set stabilized plaster of calcined gypsum which comprises mixing calcined gypsum with water and allowing the mixture to set, mixing Portland cement with water and allowing the mixture to set, reducing said set calcined gypsum and said set Portland cement to comminuted form, and mixing said set and comminuted calcined gypsum and Portland cement with calcined gypsum capable of setting upon mixture with water.

5. Method of producing a set stabilized plaster of calcined gypsum which comprises preparing a mixture of calcined gypsum and Portland cement with water, allowing the mixture to set, reducing the set material to comminuted form, and incorporating said set and comminuted material with calcined gypsum capable of setting upon mixture with water.

6. Method of producing a set stabilized plaster of calcined gypsum which comprises incorporating set Portland cement and set calcined gypsum in comminuted form with calcined gypsum which is capable of setting upon mixture with water.

7. Method of producing a set stabilized plaster of calcined gypsum which comprises incorporating in comminuted form set Portland cement and set calcined gypsum with calcined gypsum while in the heated condition resulting from the calcination process and which is capable of setting upon mixture with water.

8. An hydraulic setting material comprising a base of calcined gypsum having admixed therewith an auxiliary product comprising calcined gypsum in set condition and Portland cement in set condition, the amount of the auxiliary product being substantially in the range between ¼% and 5%.

9. Calcined gypsum plaster comprising calcined gypsum, $CaSO_4 \frac{1}{2}H_2O$, calcined gypsum in set condition, $CaSO_4 2H_2O$, Portland cement hydrolized and set, the set materials being in comminuted form and mixed with the calcined gypsum, $CaSO_4 \frac{1}{2}H_2O$, and a retarder.

10. Method of producing a set stabilized plaster of calcined gypsum which comprises incorporating with calcined gypsum which is capable of setting upon mixture with water set Portland cement and set calcined gypsum, and a retarder.

HARRY F. GARDNER.